(12) United States Patent
Thuillier

(10) Patent No.: US 9,903,473 B2
(45) Date of Patent: Feb. 27, 2018

(54) METHOD FOR CARRYING OUT EMERGENT SHAFT SEALING FOR REACTOR COOLANT PUMP AND SHAFT SEALING ASSEMBLY

(71) Applicant: AREVA NP, Courbevoie (FR)

(72) Inventor: Romain Thuillier, Valenciennes (FR)

(73) Assignee: AREVA NP, Courbevoie (FR)

( * ) Notice: Subject to any disclaimer, the term of this patent is extended or adjusted under 35 U.S.C. 154(b) by 0 days.

(21) Appl. No.: 15/102,470

(22) PCT Filed: Dec. 10, 2014

(86) PCT No.: PCT/EP2014/077285
§ 371 (c)(1),
(2) Date: Jun. 7, 2016

(87) PCT Pub. No.: WO2015/086708
PCT Pub. Date: Jun. 18, 2015

(65) Prior Publication Data
US 2016/0312893 A1    Oct. 27, 2016

(30) Foreign Application Priority Data

Dec. 10, 2013   (CN) .......................... 2013 1 0671666

(51) Int. Cl.
*F16J 9/00*        (2006.01)
*F16J 15/00*       (2006.01)
(Continued)

(52) U.S. Cl.
CPC .............. *F16J 15/008* (2013.01); *F04D 7/06* (2013.01); *F04D 7/08* (2013.01); *F04D 29/126* (2013.01);
(Continued)

(58) Field of Classification Search
CPC ...... F16J 15/008; F16J 15/164; F16J 15/3404; F04D 7/06; F04D 7/08;
(Continued)

(56) References Cited

U.S. PATENT DOCUMENTS 3,566,901 A * 3/1971 Swedberg ............... F04C 2/101
                                                       137/115.13
5,562,294 A * 10/1996 Marsi ..................... F16J 15/164
                                                            277/358
(Continued)

FOREIGN PATENT DOCUMENTS

EP      0 023 993 A1    2/1981
FR      2 985 296 A1    7/2013
(Continued)

OTHER PUBLICATIONS

Search Report for corresponding International Application PCT/EP2014/077285.

*Primary Examiner* — Nathan Cumar
(74) *Attorney, Agent, or Firm* — Davidson, Davidson & Kappel, LLC

(57) ABSTRACT

A method for carrying out emergent shaft sealing for a reactor coolant pump and a shaft sealing assembly is provided. The method comprises the steps that a passive stopping sealing member is arranged in a first sealing assembly and forms an opening under the normal operation condition, without affecting the first sealing assembly using a liquid film formed by fluid static pressure to prevent reactor coolant from leaking along a pump shaft; under the station blackout condition, after sensing high-temperature fluid flowing into the first sealing assembly, the passive stopping sealing member is closed and holds the pump shaft of the reactor coolant pump tightly, the gap between the first sealing assembly and the pump shaft of the reactor coolant (Continued)

pump is blocked, and therefore the reactor coolant is prevented from leaking along the pump shaft.

13 Claims, 4 Drawing Sheets

(51) Int. Cl.
| | | |
|---|---|---|
| *F04D 7/08* | (2006.01) | |
| *F04D 29/14* | (2006.01) | |
| *F16J 15/16* | (2006.01) | |
| *F16J 15/34* | (2006.01) | |
| *F04D 29/12* | (2006.01) | |
| *F04D 7/06* | (2006.01) | |

(52) U.S. Cl.
CPC .......... *F04D 29/146* (2013.01); *F16J 15/164* (2013.01); *F16J 15/3404* (2013.01); *F05B 2240/57* (2013.01)

(58) Field of Classification Search
CPC .... F04D 29/10–29/168; F04D 15/0077; F05B 2240/57; G21D 1/04; G21C 115/24; G21C 3/028; G21C 15/00; G21C 19/28
USPC ......................................................... 277/300
See application file for complete search history.

(56) References Cited

U.S. PATENT DOCUMENTS

| | | | |
|---|---|---|---|
| 2010/0150715 A1* | 6/2010 | Howard | ................. F16J 15/164 415/230 |
| 2015/0050141 A1 | 2/2015 | Savin | |
| 2015/0108721 A1 | 4/2015 | Thuillier | |

FOREIGN PATENT DOCUMENTS

| | | | | |
|---|---|---|---|---|
| FR | 2 986 300 A1 | | 8/2013 | |
| FR | 2986300 | * | 3/2014 | ............ F16J 15/008 |
| WO | WO 2007/047104 A1 | | 4/2007 | |
| WO | WO 2010/068615 A2 | | 6/2010 | |

* cited by examiner

METHOD FOR CARRYING OUT EMERGENT SHAFT SEALING FOR REACTOR COOLANT PUMP AND SHAFT SEALING ASSEMBLY

FIELD OF THE INVENTION

The present invention relates to the field of nuclear power, and particularly to a method for carrying out emergent shaft sealing for a reactor coolant pump and a shaft sealing assembly.

BACKGROUND OF THE INVENTION

In a pressurized water reactor nuclear power plant, a reactor coolant pump is usually called a main pump. A liquid static pressure shaft sealing type nuclear main pump is a single-stage, single-suction upstanding mixed-flow pump driven by a three-phase induction type motor. FIG. 1 is a schematic view of a main pump of a typical second-generation and its improved nuclear power plant, wherein the main pump consists of, from up to down, a motor, a shaft sealing assembly and a water power member. A shaft (briefly called pump shaft) of the reactor coolant pump runs through a center of the whole pump. The reactor coolant is pumped in a fluid form by an impeller mounted at a lower end of the pump shaft, the coolant is sucked in through a bottom of the pump housing, and flows upwards through the impeller, and then is discharged through a guide vane and an outlet pipe on a lateral side of the pump housing.

FIG. 2 and FIG. 3 are respectively a schematic view of a static pressure shaft sealing assembly and a first sealing assembly of the main pump shown in FIG. 1. The shaft sealing assembly employs a three-stage shaft sealing, respectively a first sealing assembly (also called No. 1 sealing), a second sealing assembly (also called No. 2 sealing) and a third sealing assembly (also called No. 3 sealing) from bottom to top. Under normal operation conditions, the cooling of the first sealing assembly is guaranteed by infill water provided by a chemical and volume control system (shortly called RCV). Under station blackout (shortly called SBO) conditions, the RCV system loses its function and cannot provide normal cooling for the shaft sealing assembly in the main pump. Meanwhile, an equipment cooling water system (shortly RRI) also loses its function and cannot provide standby cooling for the shaft sealing assembly in the main pump. At this time, high-temperature fluid of a loop quickly threatens the shaft sealing assembly of the main pump, and its thermal stress might cause the loss of the main pump shaft sealing function, thereby damaging a loop pressure boundary.

As shown in FIG. 4, in the prior art, emergent seal injection is usually used to solve the integrity issue of main pump shaft sealing under the SBO condition. After occurrence of SBO, a hydraulic test pump diesel generator set supplies power to a loop hydraulic test pump RIS011P0. In an emergent case, after an activation instruction is received, the hydraulic test pump diesel generator set is put into use within two minutes to ensure that the hydraulic test pump emergently injects water to the main pump shaft sealing assembly to maintain the cooling and lubrication at the location of the first sealing assembly and meanwhile limit the high-temperature high-pressure reactor coolant downstream the first sealing assembly to ensure that the temperature at the location of the first sealing assembly is within a scope as required by the operation thereof and prevent loss of coolant accident (abbreviated as LOCA) of the main pump shaft sealing assembly so as to ensure integrity of a loop pressure boundary.

However, the present-day second-generation and improved nuclear power plants are mostly of a double-reactor configuration. Two sets of units share one hydraulic test pump. The design only considers blackout accident of a single set of unit, a nominal flow of the hydraulic test pump is 6 m3/h and the flow can only meet the requirement for amount of injection of shaft sealing water of one set of unit, namely, three sets of main pumps. Upon occurrence of SBO, emergent shaft seal injection of main pumps of the other set of unit cannot be ensured, seal LOCA will be caused. After all water replenishing means are lost, leakage of one loop cannot be replenished, water amount cannot be ensured so that the reactor core gradually gets exposed and finally melts.

SUMMARY OF THE INVENTION

A technical problem to be solved by the embodiments of the present invention is to overcome the drawback in the prior art that the emergent shaft sealing injection manner cannot meet the needs of integrity of shaft seal of the main pump in a nuclear power plant and to provide a method for carrying out emergent shaft sealing for a reactor coolant pump and a shaft sealing assembly, not depending on an emergent shaft sealing injection system.

In order to solve the above technical problem, an embodiment of the present invention provides a shaft sealing assembly comprising a first sealing assembly which uses a liquid membrane formed by fluid static pressure to seal the reactor coolant pump under normal operation condition, the shaft sealing assembly further comprises a passive stopping sealing member disposed in the first sealing assembly and used to seal the reactor coolant pump under a station blackout condition, the passive stopping sealing member comprises an induction driving portion and a sealing ring provided in the circumferential direction of the pump shaft of the reactor coolant pump, the sealing ring has an opening, the induction driving portion is used to, after sensing high-temperature fluid flowing into the first sealing assembly upon the station blackout condition, drive the sealing ring to close and holds the pump shaft of the reactor coolant pump tightly, a gap between the first sealing assembly and the pump shaft of the reactor coolant pump is blocked, and therefore the reactor coolant is prevented from leaking along the pump shaft.

wherein, the induction driving portion comprises a fusible support ring and an elastic pressing ring, wherein the fusible support ring is made from a fusible material which fusing point is lower than the temperature of the high-temperature fluid. Under normal operation condition, the fusible support ring is used to prevent the elastic pressing ring from applying a radial pressure to the sealing ring; under the station blackout condition, the fusible support ring is fused by the high-temperature fluid, and the elastic pressing ring applies a radial pressure to the sealing ring to close the sealing ring.

wherein, the first sealing assembly comprises a first sealing member, a first sealing insert and a first sealing insert support disposed in turn between a water power member and a motor; the passive stopping sealing member is disposed in the first sealing insert adjacent to one end of the first sealing insert support.

wherein, the induction driving portion further comprises a piston driving ring disposed around the sealing ring, one end of the fusible support ring abuts against the first sealing insert support, and the other end abuts against the piston driving ring; the elastic pressing ring is disposed on one side of the piston driving ring away from the fusible support ring; a first slope is on one side of the sealing ring opposite to the piston driving ring; on one side of the piston driving ring opposite to the sealing ring there is a second slope tangential with the first slope, and a diameter of the piston driving ring gradually reduces in a direction from the elastic pressing ring towards the fusible support ring; under normal operation condition, the fusible support ring uses a frictional force between it and the first sealing insert support and a frictional force between it and the piton driving ring to offset a radial pressure of the elastic pressing ring; under the station blackout operation condition, the fusible support ring is fused by the high-temperature fluid, and the elastic pressing ring applies a radial pressure to the piston driving ring to urge the piston driving ring to move towards the first sealing insert support and close the opening.

wherein, the first sealing assembly comprises a first sealing member, a first sealing insert and a first sealing insert support disposed in turn between a water power member and a motor; the passive stopping sealing member is disposed in the first sealing insert adjacent to one end of the first sealing insert.

wherein, the induction driving portion further comprises a piston driving ring disposed around the sealing ring, one end of the fusible support ring abuts against the first sealing insert, and the other end abuts against the piston driving ring; the elastic pressing ring is disposed on one side of the piston driving ring away from the fusible support ring; a first slope is on one side of the sealing ring opposite to the piston driving ring; on one side of the piston driving ring opposite to the sealing ring there is a second slope tangential with the first slope, and a diameter of the piston driving ring gradually reduces in a direction from the elastic pressing ring towards the fusible support ring; under normal operation condition, the fusible support ring uses a frictional force between it and the first sealing insert support and a frictional force between it and the piton driving ring to offset a radial pressure of the elastic pressing ring; under the station blackout operation condition, the fusible support ring is fused by the high-temperature fluid, and the elastic pressing ring applies a radial pressure to the piston driving ring to urge the piston driving ring to move towards the first sealing insert support and close the opening.

wherein the passive stopping sealing member further comprises a fusible limiting ring configured to limit movement of the sealing ring away from the piston driving ring under normal operation condition, and the fusible limiting ring is made from a fusible material which fusing point is lower than the temperature of the high-temperature fluid.

wherein, the fusible limiting ring is integrally formed with the fusible support ring.

wherein, the elastic pressing ring is a belleville spring.

wherein, one end of the opening of the sealing ring is provided with an arcuate insertion portion, the other end of the opening of the sealing ring is provided with an insertion slot for receiving the insertion portion; under normal operation condition, the insertion portion is partially inserted into the insertion slot; under the station blackout condition, the insertion portion is completely inserted into the insertion slot and the whole sealing ring completely holds the pump shaft tightly.

On the other hand, an embodiment of the present invention further provides a method for carrying out emergent shaft sealing for a reactor coolant pump, comprising the following: a passive stopping sealing member is arranged in a first sealing assembly, a sealing ring of the passive stopping sealing member forms an opening under the normal operation condition, without affecting the first sealing assembly using a liquid film formed by fluid static pressure to prevent reactor coolant from leaking along a pump shaft; under the station blackout condition, after sensing high-temperature fluid flowing into the first sealing assembly, an induction driving portion of the passive stopping sealing member drives the sealing ring to close and hold the pump shaft of the reactor coolant pump tightly, a gap between the first sealing assembly and the pump shaft of the reactor coolant pump is blocked, and therefore the reactor coolant is prevented from leaking along the pump shaft.

wherein, the induction driving portion comprises a fusible support ring and an elastic pressing ring, wherein the fusible support ring is made from a fusible material which fusing point is lower than the temperature of the high-temperature fluid; under normal operation condition, the fusible support ring prevents the elastic pressing ring from applying a radial pressure to the sealing ring; under the station blackout condition, the fusible support ring is fused by the high-temperature fluid, and the elastic pressing ring applies a radial pressure to the sealing ring to close the sealing ring.

wherein, the first sealing assembly comprises a first sealing member, a first sealing insert and a first sealing insert support disposed in turn between a water power member and a motor;

the step of arranging the passive stopping sealing member in the first sealing assembly comprises: disposing the passive stopping sealing member in the first sealing insert adjacent to one end of the first sealing insert support.

wherein the induction driving portion further comprises a piston driving ring disposed around the sealing ring, one end of the fusible support ring abuts against the first sealing insert support, and the other end abuts against the piston driving ring; the elastic pressing ring is disposed on one side of the piston driving ring away from the fusible support ring; a first slope is on one side of the sealing ring opposite to the piston driving ring; on one side of the piston driving ring opposite to the sealing ring there is a second slope tangential with the first slope, and a diameter of the piston driving ring gradually reduces in a direction from the elastic pressing ring towards the fusible support ring; under normal operation condition, the fusible support ring uses a frictional force between it and the first sealing insert support and a frictional force between it and the piton driving ring to offset a radial pressure of the elastic pressing ring; under the station blackout operation condition, the fusible support ring is fused by the high-temperature fluid, and the elastic pressing ring applies a radial pressure to the piston driving ring to urge the piston driving ring to move towards the first sealing insert support and close the opening.

wherein, the first sealing assembly comprises a first sealing member, a first sealing insert and a first sealing insert support disposed in turn between a water power member and a motor;

wherein, the step of arranging the passive stopping sealing member in the first sealing assembly comprises: disposing the passive stopping sealing member in the first sealing insert support adjacent to one end of the first sealing insert.

wherein, the induction driving portion further comprises a piston driving ring disposed around the sealing ring, one end of the fusible support ring abuts against the first sealing insert, and the other end abuts against the piston driving ring; the elastic pressing ring is disposed on one side of the piston driving ring away from the fusible support ring; a first slope is on one side of the sealing ring opposite to the piston driving ring; on one side of the piston driving ring opposite to the sealing ring there is a second slope tangential with the first slope, and a diameter of the piston driving ring gradually reduces in a direction from the elastic pressing ring towards the fusible support ring; under normal operation condition, the fusible support ring uses a frictional force between it and the first sealing insert support and a frictional force between it and the piton driving ring to offset a radial pressure of the elastic pressing ring; under the station blackout operation condition, the fusible support ring is fused by the high-temperature fluid, and the elastic pressing ring applies a radial pressure to the piston driving ring to urge the piston driving ring to move towards the first sealing insert support and close the opening.

wherein, the passive stopping sealing member further comprises a fusible limiting ring made from a fusible material which fusing point is lower than the temperature of the high-temperature fluid; under normal operation condition, the fusible limiting ring is configured to limit movement of the sealing ring away from the piston driving ring.

Embodiments of the present invention have the following advantageous effects: the passive stopping sealing member is provided in the first sealing assembly to sense the high-temperature fluid flowing into the first sealing assembly upon the station blackout condition, and block the gap between the first sealing assembly and the pump shaft of the reactor coolant pump after sensing the high-temperature fluid and thereby seal the reactor coolant pump; the present invention effectively solves the leakage issue of the shaft sealing of the main pump upon SBO condition in a second-generation plus dual reactor nuclear power plant, and reduces a probability of reactor core damage of the nuclear power plant; since the passive stopping sealing member is disconnected under normal operation condition, it does not affect the performance of the main pump under normal operation condition.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DETAILED DESCRIPTION OF PREFERRED EMBODIMENTS

The following clearly and completely describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

A shaft sealing assembly of a reactor coolant system usually comprises three tiers of shaft sealing connected in series and is located at a distal end of the pump shaft, and its function is to ensure the amount of leakage of the reactor coolant system along the pump shaft towards a security housing during normal operation of the power plant is substantially zero. The first tier of shaft sealing is controllable liquid membrane sealing, and the second and third tiers of sealing is friction surface sealing.

Figure 1:
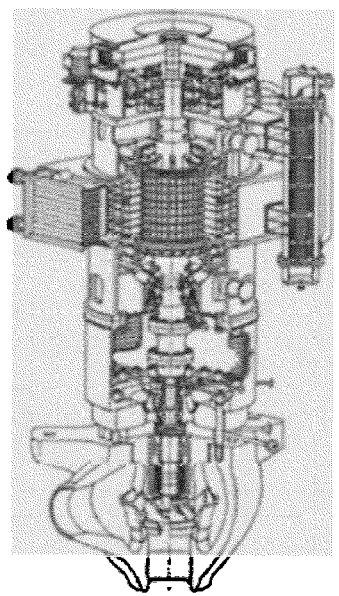
FIG. 1 is a schematic view of a main pump of a typical second-generation and its improved nuclear power plant in the prior art.
Figure 2:
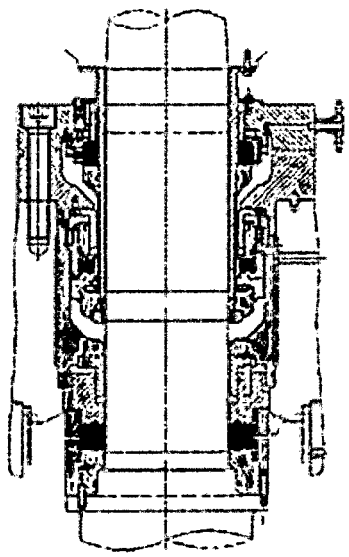
FIG. 2 is a sectional view of a static pressure shaft sealing assembly in the main pump shown in FIG. 1.
Figure 3:
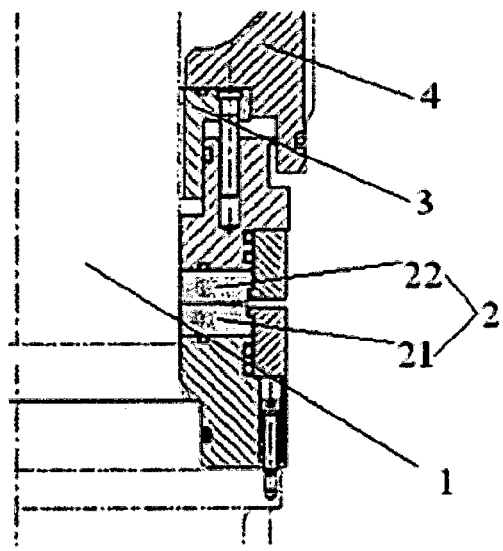
FIG. 3 is a sectional view of a first sealing assembly in the main pump shown in FIG. 1.
Figure 4:
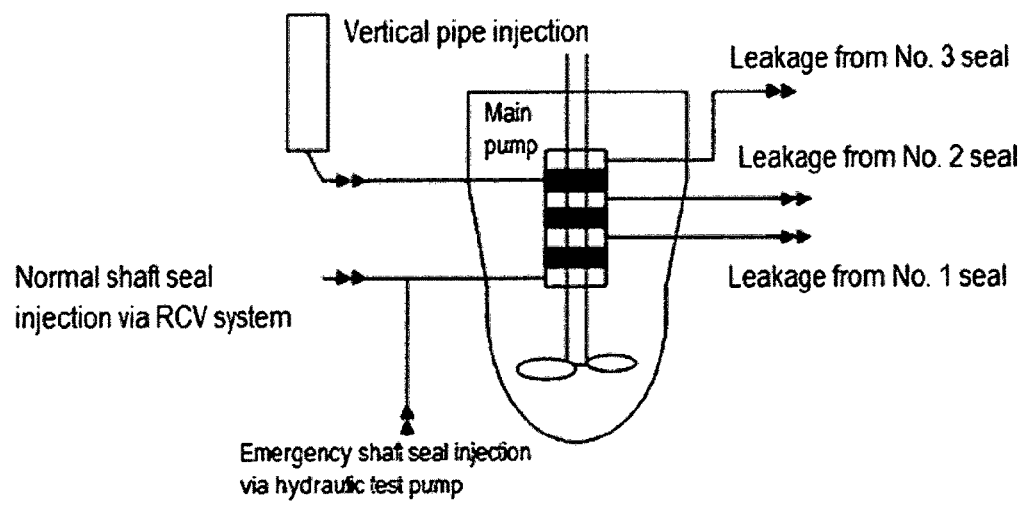
FIG. 4 is a schematic view of a shaft sealing auxiliary system of a main pump of a typical second-generation and its improved nuclear power plant in the prior art.

The first tier of shaft sealing is a first sealing assembly and a balance type fluid static pressure controllable leakage sealing. As shown in FIG. 3, the first sealing assembly is provided in a circumferential direction of the pump shaft 1, the first sealing assembly comprises a first sealing member 2, a first sealing insert 3 and a first sealing insert support 4 disposed in turn between a water power member and a motor, wherein the first sealing insert 3 and the first sealing insert support 4 both remain a gap with the pump shaft 1. The first sealing member 2 comprises a movable ring 21 and a static ring 22, the moveable ring 21 is rotatably fixed on the pump shaft 1, the static ring 22 is not rotatable but may move up and down with a small amplitude in an axial direction or oblique direction of the pump, to follow the movement of the movable ring 21. Under normal operation conditions, the static ring 22 gets balanced through hydrostatic force, an extremely small gap is controlled to remain between the movable ring 21 and the static ring 22 to form a liquid membrane so that two end faces of the movable ring 21 and the static ring 22 slide relative to each other on both sides of a layer of thin water membrane and do not directly contact each other upon operation, whereby the amount of leakage and amount of wear of the shaft sealing assembly is controlled. An O-ring and an auxiliary element are provided between the static ring 22 and a structural member, and slideable auxiliary sealing is formed between a high-pressure area and a low-pressure area.

The second tier of shaft sealing is a second sealing assembly and belongs to pressure balance type end face sealing, and it functions to constitute backpressure of the first sealing assembly and guide leaked water to flow back to the RCV system. The second sealing assembly is capable of bearing the operation pressure of all the system, and its another major function is to serve as standby seal upon damage of the first sealing assembly.

The third tier of shaft sealing is a third sealing assembly and belongs to a dam type dual end face seal. It is substantially identical with the second sealing assembly in structure, but it needn't bear the pressure of all the system. Rinsing water is filled through a vertical tube to the middle of the static ring 22 to respectively lubricate and cool the two end faces for sealing and prevent precipitation of boron crystals.

Figure 5:
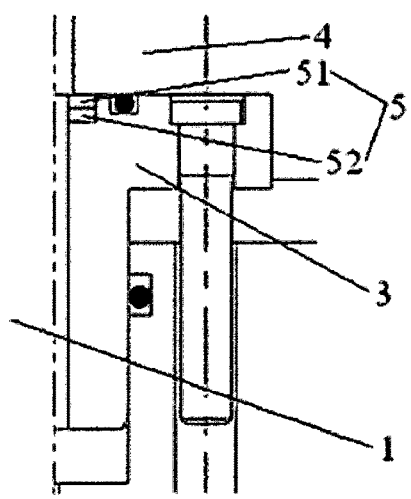
FIG. 5 is a sectional view of a passive stopping sealing member disposed in a first sealing insert according to a first embodiment of the present invention.
Figure 6:
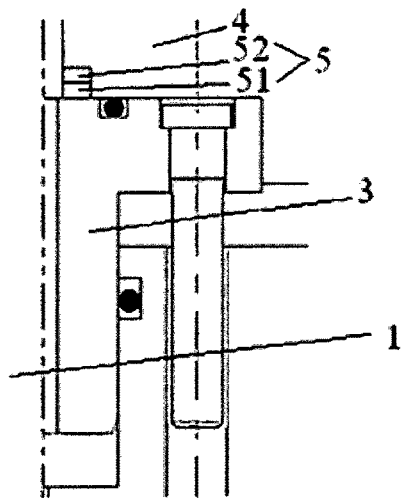
FIG. 6 is a sectional view of a passive stopping sealing member disposed in a first sealing insert according to a second embodiment of the present invention.

As shown in FIG. 5 and FIG. 6, to allow for quick sealing of the pump shaft 1 in the event of station blackout condition, in an embodiment of the present invention, a passive stopping sealing member 5 is provided in the first sealing assembly. Under normal operation condition, a sealing ring 51 of the passive stopping sealing member forms an opening without affecting the normal shaft sealing function of the first sealing assembly, namely, without affecting the first sealing assembly using a liquid film formed by fluid static pressure to prevent reactor coolant from leaking along a pump shaft 1; under the station blackout condition, after sensing high-temperature fluid flowing into the first sealing assembly, an induction driving portion 52 of the passive stopping sealing member drives the sealing ring 51 to close and holds the pump shaft 1 of the reactor coolant pump tightly, the gap between the first sealing assembly and the pump shaft 1 of the reactor coolant pump is blocked, and therefore the reactor coolant is prevented from leaking along the pump shaft 1.

The passive stopping sealing member 5 may comprise an induction driving portion 52 and a sealing ring 51 provided in the circumferential direction of the pump shaft 1 of the reactor coolant pump, the sealing ring 51 has an opening, the induction driving portion 52 is used to, after sensing high-temperature fluid (e.g., high-temperature reactor coolant) flowing into the first sealing assembly upon the station blackout condition, drive the sealing ring 51 to close and holds the pump shaft 1 of the reactor coolant pump tightly, the gap between the first sealing assembly and the pump shaft 1 of the reactor coolant pump is blocked, and therefore the reactor coolant is prevented from leaking along the pump shaft 1.

Figure 8:
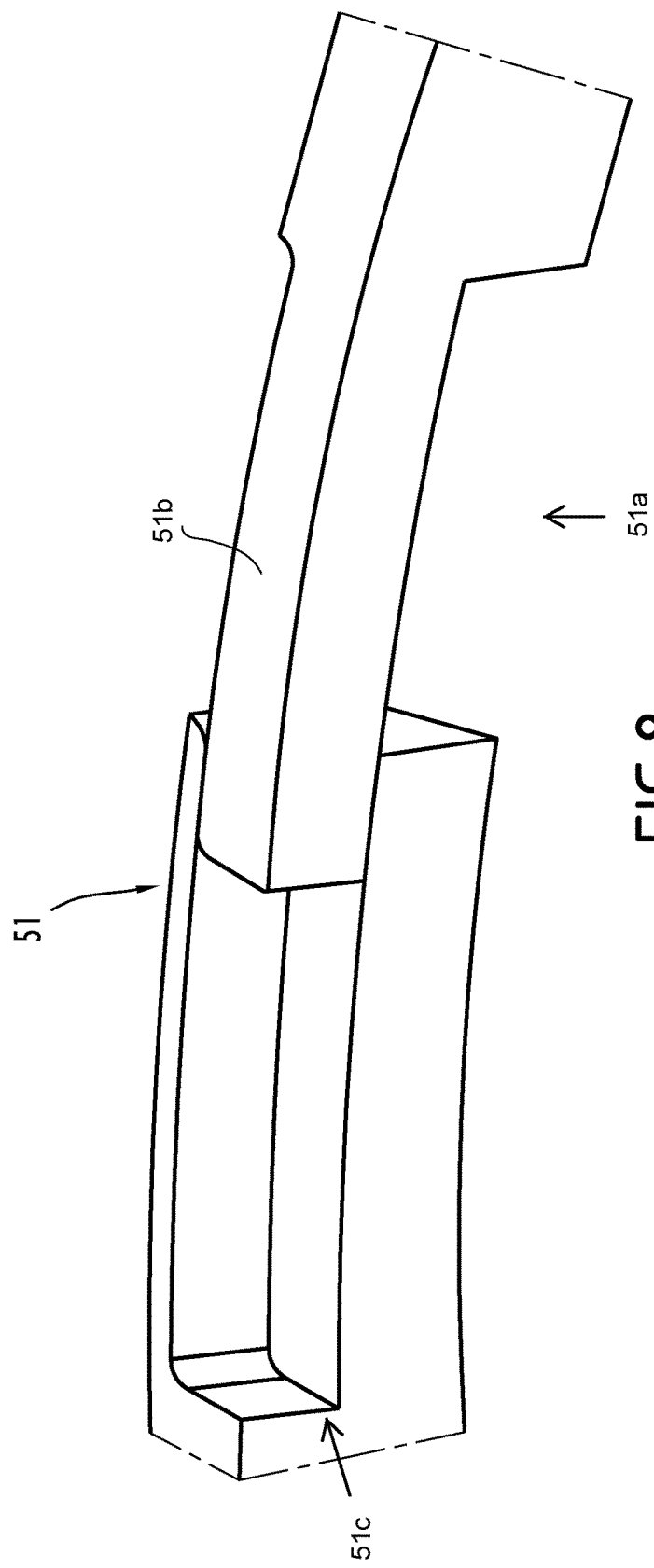
FIG. 8 is a perspective view of an opening of a sealing ring in accordance with an embodiment of the present invention.

The opening of the sealing ring 51 may be of various opening structures well known by those skilled in the art. For example, as shown in FIG. 8, one end of an opening 51a of the sealing ring 51 is provided with an arcuate insertion portion 51b, the other end of the opening 51a of the sealing ring 51 is provided with an insertion slot 51c for receiving the insertion portion 51b; under normal operation condition, the insertion portion 51c is partially inserted into the insertion slot 51b; under the station blackout condition, the insertion portion 51c is completely inserted into the insertion slot 51b and the whole sealing ring 51 completely holds the pump shaft 1 tightly.

According to a method for carrying out emergent shaft sealing on reactor coolant pump and a shaft sealing assembly under SBO condition according to embodiments of the present invention, the passive stopping sealing member is provided in the first sealing assembly to sense the high-temperature fluid flowing into the first sealing assembly upon the station blackout condition, and block the gap between the first sealing assembly and the pump shaft of the reactor coolant pump after sensing the high-temperature fluid and thereby seal the reactor coolant pump; the present invention effectively solves the leakage issue of the shaft sealing of the main pump upon SBO condition in a second-generation plus dual reactor nuclear power plant, and reduces a probability of reactor core damage of the nuclear power plant; since the passive stopping sealing member is disconnected under normal operation condition, it does not affect the performance of the main pump under normal operation condition.

The passive stopping sealing member 5 may be disposed in the first sealing insert 3 adjacent to one end of the first sealing insert support 4 (FIG. 5), or disposed in the first sealing insert support 4 adjacent to one end of the first sealing insert 3 (FIG. 6).

In the embodiments shown in FIG. 5 and FIG. 6, the induction driving portion 52 may be an electronic device in which a battery is built, or may be a mechanical structural assembly having a corresponding function. For example, the induction driving portion 52 may comprise various sensors (e.g., temperature sensor, fluid sensor, and flow sensor) and a driving rod communicatively connected with the sensor. When the sensor senses the high-temperature fluid, the driving rod is controlled to push the opening of the sealing ring 51 to close.

Figure 7:
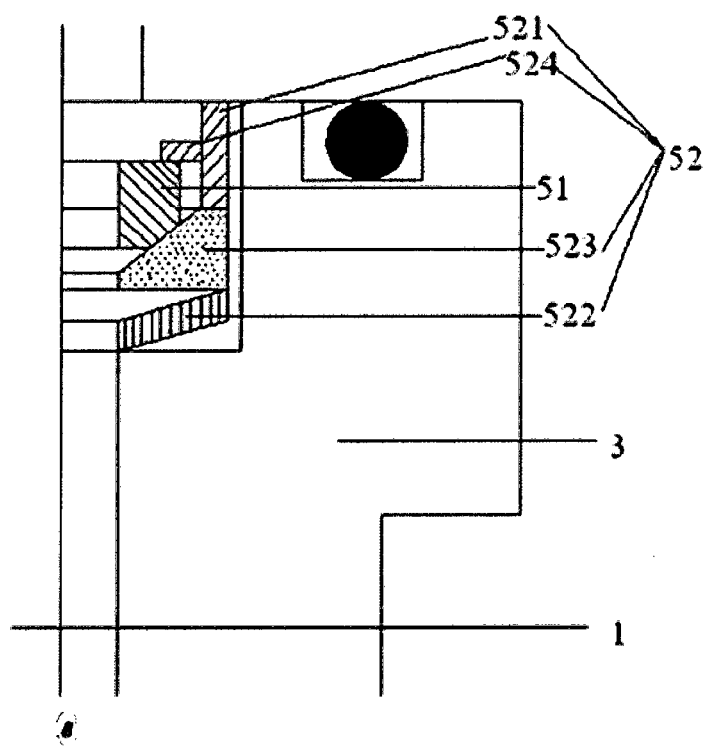
FIG. 7 is a sectional view of a passive stopping sealing member disposed in a first sealing insert support according to a third embodiment of the present invention.

However, as the temperature of the high-temperature fluid is relatively high, it is not secure to use such electronic device as the induction driving portion 52. Since a nuclear power plant has high requirements for security, it is preferable to use a mechanical structural assembly as the induction driving portion 52. For example, as shown in FIG. 7, the induction driving portion 52 may comprise a fusible support ring 521 and an elastic pressing ring 522, wherein the fusible support ring 521 is made from a fusible material which fusing point is lower than the temperature of the high-temperature fluid. Under normal operation condition, the fusible support ring 521 is used to prevent the elastic pressing ring 522 from applying a radial pressure to the sealing ring 51; under the station blackout condition, the fusible support ring 521 is fused by the high-temperature fluid, and the elastic pressing ring 522 applies a radial pressure to the sealing ring 51 to close the sealing ring 51. For example, when the passive stopping sealing member 5 is disposed in the first sealing insert 3 adjacent to one end of the first sealing insert support 4, the sealing ring 51, the fusible support ring 521 and the elastic pressing ring 522 are disposed to surround the pump shaft 1 in turn from inside to outside, and an inner diameter of the fusible support ring 521 is by far greater than an inner diameter of the sealing ring 51, one end of the fusible support ring 521 is fixed on the first sealing insert support 4 to resist against the radial pressure of the elastic pressing ring 522, the elastic pressing ring 522 is fixed on the fusible support ring 521 or at least partially fixed on the pump shaft 1; under normal operation condition, the sealing ring 51 has an opening, and the elastic pressing ring 522 holds the fusible support ring 521 tightly; under the station blackout operation condition, the fusible support ring 521 is fused by the high-temperature fluid (namely, the high-temperature reactor coolant), whereupon the elastic pressing ring 522 retracts inward to generate a radial pressure to act upon the sealing ring 51 to close the opening of the sealing ring 51. When the passive stopping sealing member 5 may be disposed in the first sealing insert support 4 adjacent to one end of the first sealing insert 3, it also has a similar structure. However, those skilled in the art should appreciate that this is only an embodiment of the present invention. In other embodiments of the present invention, various schemes well known by those skilled in the art may be employed to allow the fusible support ring 521 to limit the position of the elastic pressing ring 522 and allow the elastic pressing ring 522 to urge the opening of the sealing ring 51 to close after the fusing of the support ring 521. Hereunder, reference is made to FIG. 7 to describe another preferred embodiment.

As shown in FIG. 7, in the preferred embodiment, the passive stopping sealing member 5 is disposed in the first sealing insert 3 adjacent to one end of the first sealing insert support 4. The induction driving portion 52 comprises a fusible support ring 521, an elastic pressing ring 522 and a piston driving ring 523. The piston driving ring 523 is disposed to surround the sealing ring 51. The fusible support ring 521 is made of a fusible material which fusing point is lower than the temperature of the high-temperature fluid, one end of the fusible support ring 521 abuts against the first sealing insert support 4, and the other end abuts against the piston driving ring 523. The elastic pressing ring 522 is disposed on one side of the piston driving ring 523 away from the fusible support ring 523, and for example, the elastic pressing ring 522 may be a belleville spring. A first slope is on one side of the sealing ring 51 opposite to the piston driving ring 523; on one side of the piston driving ring 523 opposite to the sealing ring 51 there is a second slope tangential with the first slope, and the diameter of the piston driving ring 523 gradually reduces in a direction from the elastic pressing ring 522 towards the fusible support ring 521. Under normal operation condition, the fusible support ring 521 uses a frictional force between it and the first sealing insert support and a frictional force between it and the piton driving ring 523 to offset the radial pressure of the elastic pressing ring 523; under the station blackout operation condition, the fusible support ring 521 is fused by the high-temperature fluid, and the elastic pressing ring 522 applies a radial pressure to the piston driving ring 523 to urge the piston driving ring 523 to move towards the first sealing insert support and close the opening.

When the passive stopping sealing member 5 may be disposed in the first sealing insert support 4 adjacent to one end of the first sealing insert 3, it also has a similar structure. Specifically, at this time, one end of the fusible support ring 521 abuts against the first sealing insert 3, and the other end abuts against the piston driving ring 523. The elastic pressing ring 522 is disposed on one side of the piston driving ring 523 away from the fusible support ring 523, and for example, the elastic pressing ring 522 may be a belleville spring. A first slope is on one side of the sealing ring 51 opposite to the piston driving ring 523; on one side of the piston driving ring 523 opposite to the sealing ring 51 there is a second slope tangential with the first slope, and the diameter of the piston driving ring 523 gradually reduces in a direction from the elastic pressing ring 522 towards the fusible support ring 521. Under normal operation condition, the fusible support ring 521 uses a frictional force between it and the first sealing insert support and a frictional force between it and the piton driving ring 523 to offset the radial pressure of the elastic pressing ring 523; under the station blackout operation condition, the fusible support ring 521 is fused by the high-temperature fluid, and the elastic pressing ring 522 applies a radial pressure to the piston driving ring 523 to urge the piston driving ring 523 to move towards the first sealing insert support and close the opening.

In the above two preferred embodiments, the fusible support ring 521 cannot well limit axial movement of the sealing ring 51, which can cause unnecessary displacement of the sealing ring 51 and affects normal operation of the reactor coolant pump. Therefore, preferably, as shown in FIG. 7, the passive stopping sealing member 5 may further comprise a fusible limiting ring 524 configured to limit movement of the sealing ring 51 away from the piston driving ring 523 under normal operation condition, and the fusible limiting ring 524 is made from a fusible material which fusing point is lower than the temperature of the high-temperature fluid. More preferably, the fusible limiting ring 524 may be integrally formed with the fusible support ring 521.

After the embodiment of the present invention is implemented, under normal operation condition, the sealing ring 51 is in a natural opened state (forming an opening), a gap remains between the sealing ring 52 and the pump shaft 1, the first sealing leakage (namely, the high-temperature reactor coolant) normally flows between the first sealing insert 3 and the pump shaft 1 and enters a first sealing leakage pipeline. Under the station blackout condition, the filled water and the cooling water for the shaft sealing of the main pump fail at the same time, and the high-temperature and high-pressure reactor coolant flows upwards. When a temperature at the fusible support ring reaches its fusing temperature, the fusible support ring is subjected to phase change, whereupon the piston driving ring, under action of the pressing force of the pressing ring, pushes the sealing ring upwardly to retract inwardly (with the opening closed) so that the sealing ring holds the pump shaft tightly and achieve the sealing function. At this time, the reactor coolant enters the outside of the sealing ring 51 to press the sealing ring tightly so that the sealing ring is in a sealed state.

The foregoing disclosed descriptions are merely exemplary embodiments of the present invention, but are not intended to limit the scope of the present invention. Those having ordinary skill in the art may understand implementation of all or partial flow of the above embodiments. Therefore, equivalent variations made according to the claims of the present invention shall fall within the protection scope of the present invention.

What is claimed is:

1. A shaft sealing assembly comprising:
   a first sealing assembly configured for using a liquid membrane formed by fluid static pressure to seal a reactor coolant pump under a normal operation condition;
   a passive stopping sealing member disposed in the first sealing assembly and configured to seal the reactor coolant pump under a station blackout condition, the passive stopping sealing member including an induction driving portion and a sealing ring provided in a circumferential direction of a pump shaft of the reactor coolant pump, the sealing ring having an opening, the induction driving portion being configured to, after sensing a high-temperature fluid flowing into the first sealing assembly upon the station blackout condition, drive the sealing ring to close and hold the pump shaft of the reactor coolant pump tightly such that a gap between the first sealing assembly and the pump shaft of the reactor coolant pump is blocked, and the reactor coolant is prevented from leaking along the pump shaft,
   wherein the induction driving portion comprises a fusible support ring and an elastic pressing ring, the fusible support ring being made from a fusible material having a fusing point lower than a temperature of the high-temperature fluid; under the normal operation condition, the fusible support ring being configured to prevent the elastic pressing ring from applying a radial pressure to the sealing ring; under the station blackout condition, the fusible support ring being fused by the high-temperature fluid, and the elastic pressing ring applying a radial pressure to the sealing ring to close the sealing ring,
   wherein the first sealing assembly comprises a first sealing member, a first sealing insert and a first sealing insert support disposed in turn between a water power member and a motor; the passive stopping sealing member being disposed in the first sealing insert adjacent to one end of the first sealing insert support or in the first sealing insert support adjacent to one end of the first sealing insert,
   wherein the induction driving portion further comprises a piston driving ring disposed around the sealing ring, the elastic pressing ring being disposed on one side of the piston driving ring away from the fusible support ring; a first slope being on one side of the sealing ring toward the piston driving ring; on one side of the piston driving ring toward the sealing ring there being a second slope tangential with the first slope, and a diameter of the piston driving ring gradually increasing in a direction from the elastic pressing ring towards the fusible support ring; under the normal operation condition, one end of the fusible support ring abutting against the first sealing insert support or the first sealing insert, and the other end abutting against the piston driving ring; under the station blackout operation condition, the fusible support ring being fused by the high-temperature fluid, and the piston driving ring, under action of a pressing force of the elastic pressing ring, pushing the sealing ring upwardly to retract inwardly so that the sealing ring holds the pump shaft tightly and achieves the sealing function, wherein the passive stopping sealing member further comprises a fusible limiting ring configured to limit movement of the sealing ring in a direction substantially parallel to the shaft away from the piston driving ring under the normal operation condition, the fusible limiting ring being made from a fusible material having a fusing point lower than the temperature of the high-temperature fluid.

2. The shaft sealing assembly according to claim 1 wherein the fusible limiting ring is integrally formed with the fusible support ring.

3. The shaft sealing assembly according to claim 1 wherein one end of the opening of the sealing ring is provided with an arcuate insertion portion, the other end of the opening of the sealing ring is provided with an insertion slot for receiving the insertion portion; under the normal operation condition, the insertion portion is partially inserted into the insertion slot; under the station blackout condition, the insertion portion is completely inserted into the insertion slot and the whole sealing ring completely holds the pump shaft tightly.

4. The shaft sealing assembly according to claim 1, wherein under the normal operation condition, the fusible limiting ring keeps the sealing ring at a distance away from the first sealing insert support or the first sealing insert along said direction substantially parallel to the shaft.

5. A method for carrying out emergent shaft sealing for a reactor coolant pump, comprising:
arranging a passive stopping sealing member in a first sealing assembly such that a sealing ring of the passive stopping sealing member forms an opening under a normal operation condition, without affecting the first sealing assembly using a liquid film formed by fluid static pressure to prevent reactor coolant from leaking along a pump shaft; and
under the station blackout condition, after sensing a high-temperature fluid flowing into the first sealing assembly, driving, by an induction driving portion of the passive stopping sealing member, the sealing ring to close and hold the pump shaft of the reactor coolant pump tightly, a gap between the first sealing assembly and the pump shaft of the reactor coolant pump being blocked, and the reactor coolant being prevented from leaking along the pump shaft,
wherein the induction driving portion comprises a fusible support ring and an elastic pressing ring, the fusible support ring being made from a fusible material having a fusing point lower than a temperature of the high-temperature fluid; under the normal operation condition, the fusible support ring preventing the elastic pressing ring from applying a radial pressure to the sealing ring; under the station blackout condition, the fusible support ring being fused by the high-temperature fluid, and the elastic pressing ring applying a radial pressure to the sealing ring to close the sealing ring,
wherein the first sealing assembly comprises a first sealing member, a first sealing insert and a first sealing insert support disposed in turn between a water power member and a motor; the step of arranging the passive stopping sealing member in the first sealing assembly comprising disposing the passive stopping sealing member in the first sealing insert adjacent to one end of the first sealing insert support or in the first sealing insert support adjacent to one end of the first sealing insert,
wherein the induction driving portion further comprises a piston driving ring disposed around the sealing ring, the elastic pressing ring being disposed on one side of the piston driving ring away from the fusible support ring; a first slope being on one side of the sealing ring toward the piston driving ring; on one side of the piston driving ring toward the sealing ring there being a second slope tangential with the first slope, and a diameter of the piston driving ring gradually increasing in a direction from the elastic pressing ring towards the fusible support ring; under the normal operation condition, one end of the fusible support ring abutting against the first sealing insert support or the first sealing insert, and the other end abutting against the piston driving ring; under the station blackout operation condition, the fusible support ring being fused by the high-temperature fluid, and the piston driving ring, under action of a pressing force of the elastic pressing ring, pushing the sealing ring upwardly to retract inwardly so that the sealing ring holds the pump shaft tightly and achieves the sealing function,
wherein the passive stopping sealing member further comprises a fusible limiting ring configured to limit movement of the sealing ring in a direction substantially parallel to the shaft away from the piston driving ring under the normal operation condition, the fusible limiting ring being made from a fusible material having a fusing point lower than the temperature of the high-temperature fluid.

6. The method according to claim 5, wherein under the normal operation condition, the fusible limiting ring keeps the sealing ring at a distance away from the first sealing insert support or the first sealing insert along said direction substantially parallel to the shaft.

7. A shaft sealing assembly comprising:
a first sealing assembly configured for using a liquid membrane formed by fluid static pressure to seal a reactor coolant pump under a normal operation condition;
a passive stopping sealing member disposed in the first sealing assembly and configured to seal the reactor coolant pump under a station blackout condition, the passive stopping sealing member including an induction driving portion and a sealing ring provided in a circumferential direction of a pump shaft of the reactor coolant pump, the sealing ring having an opening, the induction driving portion being configured to, after sensing a high-temperature fluid flowing into the first sealing assembly upon the station blackout condition, drive the sealing ring to close and hold the pump shaft of the reactor coolant pump tightly such that a gap between the first sealing assembly and the pump shaft of the reactor coolant pump is blocked, and the reactor coolant is prevented from leaking along the pump shaft, wherein the induction driving portion comprises a fusible support ring and an elastic pressing ring, the fusible support ring being made from a fusible material having a fusing point lower than a temperature of the high-temperature fluid; under the normal operation condition, the fusible support ring being configured to prevent the elastic pressing ring from applying a radial pressure to the sealing ring; under the station blackout condition, the fusible support ring being fused by the high-temperature fluid, and the elastic pressing ring applying a radial pressure to the sealing ring to close the sealing ring, wherein the first sealing assembly comprises a first sealing member, a first sealing insert and a first sealing insert support disposed in turn between a water power member and a motor; the passive stopping sealing member being disposed in the first sealing insert adjacent to one end of the first sealing insert support or in the first sealing insert support adjacent to one end of the first sealing insert, wherein the induction driving portion further comprises a piston driving ring disposed around the sealing ring, one end of the fusible support ring abutting against the first sealing insert support or the first sealing insert, and the other end abutting against the piston driving ring; the elastic pressing ring being disposed on one side of the piston driving ring away from the fusible support ring; a first slope being on one side of the sealing ring toward the piston driving ring; on one side of the piston driving ring toward the sealing ring there being a second slope tangential with the first slope, and a diameter of the piston driving ring gradually increasing in a direction from the elastic pressing ring towards the fusible support ring; under the normal operation condition, the fusible support ring using a frictional force between the fusible support ring and the first sealing insert support or the first sealing insert and a frictional force between the fusible support ring and the piston driving ring to offset a radial pressure of the elastic pressing ring; under the station blackout operation condition, the fusible support ring being fused by the high-temperature fluid, and the elastic pressing ring applying a radial pressure to the piston driving ring to urge the piston driving ring to move towards the first sealing insert support or the first sealing insert and close the opening, wherein the passive stopping sealing member further comprises a fusible limiting ring configured to limit movement of the sealing ring in a direction substantially parallel to the shaft away from the piston driving ring under the normal operation condition, the fusible limiting ring being made from a fusible material having a fusing point lower than the temperature of the high-temperature fluid.

8. The shaft sealing assembly according to claim 7 wherein the fusible limiting ring is integrally formed with the fusible support ring.

9. The shaft sealing assembly according to claim 7 wherein one end of the opening of the sealing ring is provided with an arcuate insertion portion, the other end of the opening of the sealing ring being provided with an insertion slot for receiving the insertion portion; under the normal operation condition, the insertion portion being partially inserted into the insertion slot; under the station blackout condition, the insertion portion being completely inserted into the insertion slot and the whole sealing ring completely holding the pump shaft tightly.

10. The shaft sealing assembly according to claim 7 wherein the elastic pressing ring is a belleville spring.

11. The shaft sealing assembly according to claim 7, wherein under the normal operation condition, the fusible limiting ring keeps the sealing ring at a distance away from the first sealing insert support or the first sealing insert along said direction substantially parallel to the shaft.

12. A method for carrying out emergent shaft sealing for a reactor coolant pump, comprising:

arranging a passive stopping sealing member in a first sealing assembly such that a sealing ring of the passive stopping sealing member forms an opening under a normal operation condition, without affecting the first sealing assembly using a liquid film formed by fluid static pressure to prevent reactor coolant from leaking along a pump shaft; and under the station blackout condition, after sensing a high-temperature fluid flowing into the first sealing assembly, driving, by an induction driving portion of the passive stopping sealing member, the sealing ring to close and hold the pump shaft of the reactor coolant pump tightly, a gap between the first sealing assembly and the pump shaft of the reactor coolant pump being blocked, and the reactor coolant being prevented from leaking along the pump shaft, wherein the induction driving portion comprises a fusible support ring and an elastic pressing ring, the fusible support ring being made from a fusible material having a fusing point lower than a temperature of the high-temperature fluid; under the normal operation condition, the fusible support ring preventing the elastic pressing ring from applying a radial pressure to the sealing ring; under the station blackout condition, the fusible support ring being fused by the high-temperature fluid, and the elastic pressing ring applying a radial pressure to the sealing ring to close the sealing ring, wherein the first sealing assembly comprises a first sealing member, a first sealing insert and a first sealing insert support disposed in turn between a water power member and a motor; the step of arranging the passive stopping sealing member in the first sealing assembly comprising disposing the passive stopping sealing member in the first sealing insert adjacent to one end of the first sealing insert support or in the first sealing insert support adjacent to one end of the first sealing insert, wherein the induction driving portion further comprises a piston driving ring disposed around the sealing ring, one end of the fusible support ring abutting against the first sealing insert support, and the other end abutting against the piston driving ring; the elastic pressing ring being disposed on one side of the piston driving ring away from the fusible support ring; a first slope being on one side of the sealing ring opposite to the piston driving ring; on one side of the piston driving ring opposite to the sealing ring there being a second slope tangential with the first slope, and a diameter of the piston driving ring gradually reducing in a direction from the elastic pressing ring towards the fusible support ring; under the normal operation condition, the fusible support ring using a frictional force between the fusible support ring and the first sealing insert support and a frictional force between the fusible support ring and the piton driving ring to offset a radial pressure of the elastic pressing ring; under the station blackout operation condition, the fusible support ring being fused by the high-temperature fluid, and the elastic pressing ring applying a radial pressure to the piston driving ring to urge the piston driving ring to move towards the first sealing insert support and close the opening, wherein the passive stopping sealing member further comprises a fusible limiting ring configured to limit movement of the sealing ring in a direction substantially parallel to the shaft away from the piston driving ring under the normal operation condition, the fusible limiting ring being made from a fusible material having a fusing point lower than the temperature of the high-temperature fluid.

13. The method according to claim 12, wherein under the normal operation condition, the fusible limiting ring keeps the sealing ring at a distance away from the first sealing insert support or the first sealing insert along said direction substantially parallel to the shaft.

* * * * *